United States Patent [19]

Yukitomo et al.

[11] Patent Number: 4,801,770
[45] Date of Patent: Jan. 31, 1989

[54] SWITCH ASSEMBLY

[75] Inventors: Kazuo Yukitomo; Yoshiaki Anan, both of Hiroshima; Masaichi Hattori, Aichi; Kaneyasu Arakawa, Aichi; Akira Hanaki, Aichi; Koichi Kihira, Aichi, all of Japan

[73] Assignees: Mazuda Motor Corporation, Hiroshima; Kabushiki Kaisha Tokai Rika Denki Seisakusho, Aichi, both of Japan

[21] Appl. No.: 220,324

[22] Filed: Jul. 5, 1988

Related U.S. Application Data

[63] Continuation of Ser. No. 888,167, Jul. 22, 1986, abandoned.

[30] Foreign Application Priority Data

Jul. 24, 1985 [JP] Japan .............................. 60-113497[U]

[51] Int. Cl.⁴ .............................................. H01H 3/16
[52] U.S. Cl. .................................. 200/61.27; 200/61.3
[58] Field of Search ............... 200/61.27, 61.30, 61.54, 200/12-13, 313, 316, 315

[56] References Cited

U.S. PATENT DOCUMENTS

| 2,924,680 | 2/1960 | Swenson | 200/12 |
| 4,503,296 | 3/1985 | Iwata et al. | 200/61.27 |
| 4,571,470 | 2/1986 | Hattori | 200/61.27 |

Primary Examiner—E. A. Goldberg
Assistant Examiner—Lincoln Donovan
Attorney, Agent, or Firm—Finnegan, Henderson, Farabow, Garrett, & Dunner

[57] ABSTRACT

A switch assembly in which a lever rotates a separate rotary member to operate a first electrical switch and the lever pivots within the rotary member to operate a second electrical switch. The rotating member is held at a first position and a second position when the rotary member is turned. A solenoid is linked to a cam that restores the lever to a neutral position between the first and second positions. A return mechanism returns the pivoting member to its original position when the lever is released.

14 Claims, 5 Drawing Sheets

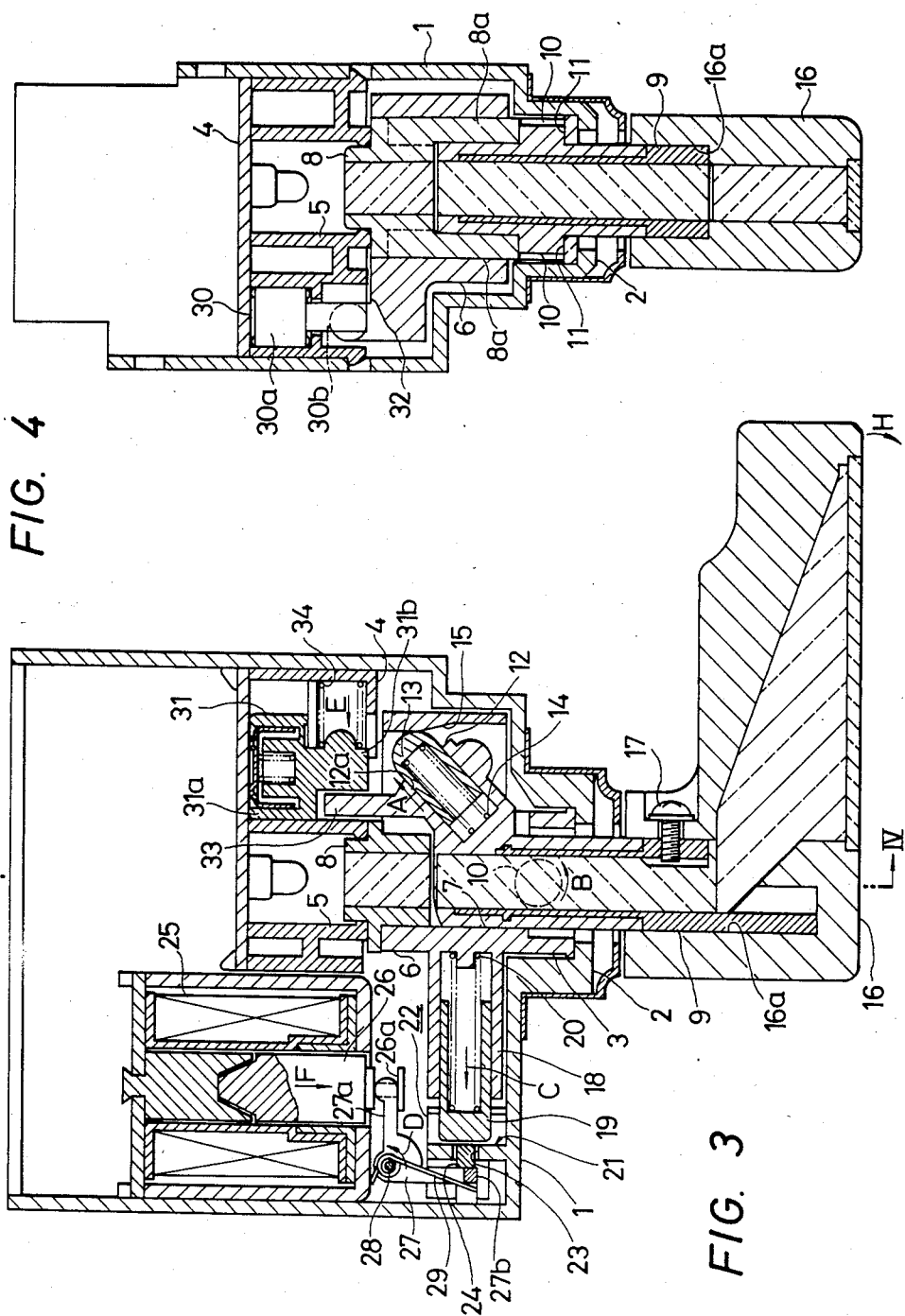

SWITCH ASSEMBLY

This application is a continuation of application Ser. No. 888,167, filed July 22, 1986, abandoned.

BACKGROUND OF THE INVENTION

This invention relates to a switch assembly in which a single operating lever operates the turn signal switches and headlight dimmer/passing switches of an automobile.

A conventional switch assembly used, for instance, for the turn signal switch of an automobile is relatively intricate in construction because an electromagnetic solenoid for automatically releasing the operating lever after the completion of the turn is built in. Therefore, a dimmer/passing switch, which is operated in association with the turn signal switch, may be a separate assembly.

The turn signal switch, and the dimmer/passing switch are used frequently during operation of the automobile. The driver operates these switches by feeling them - normally without observing them. Therefore, these switches are difficult to properly operate if they are separate assemblies. The fact that the two switches are provided separately is also disadvantageous in arrangement and in the utilization of space. Accordingly, there has been a strong demand for means which can operate both the turn signal and the dimmer/passing switches with one operating lever. Thus, it has been required to provide a single switch which can perform the two operations.

In view of the foregoing, it is an object of the present invention to provide a switch assembly with which two operations. such as turn signal operation and dimmer/passing operation can be achieved by operating one lever, thereby facilitating proper operation and occupying a relatively small space.

SUMMARY OF THE INVENTION

To achieve these and other objects of the invention, there is provided a switch assembly that includes a switch case and a rotary member supported by the switch case. The rotary member has an opening therethrough in which there is placed a pivoting member having its rear end portion inserted into the opening of the rotary member and the front end portion protruding from the front of the switch case. The pivoting member is supported within the rotary member in such a manner that the pivoting member pivots around an axis which is substantially perpendicular to the axis of rotation of the rotary member. An operating lever is attached to the front end of the pivoting member and is disposed to rotate the rotary member to a first turn position, a second turn position and a neutral position therebetween. A means for holding the rotary member at the first turn position or the second turn position, respectively, is provided when the rotary member is turned. An electromagnetic solenoid is linked to a return cam for returning the rotary member tot he neutral position. A mechanism for returning the pivoting member to the original position is provided such that it responds to the release of the operating lever. A first and second switch are provided within the switch case bein operated in response to the rotating member and the pivoting member, respectively.

BRIEF DESCRIPTION OF THE DRAWINGS

FIG. 3 is a cross-sectional view of the embodiment of FIGS. 1 and 2.

FIG. 4 is a cross-sectional view of the embodiment of FIG. 3 along the lines IV—IV.

DESCRIPTION OF THE PREFERRED EMBODIMENT

Figure 1:
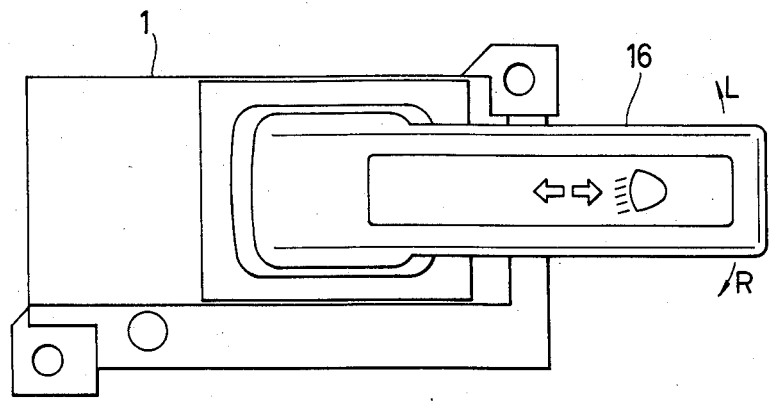
FIG. 1 is a front view of the external portion of an embodiment of the invention.
Figure 2:
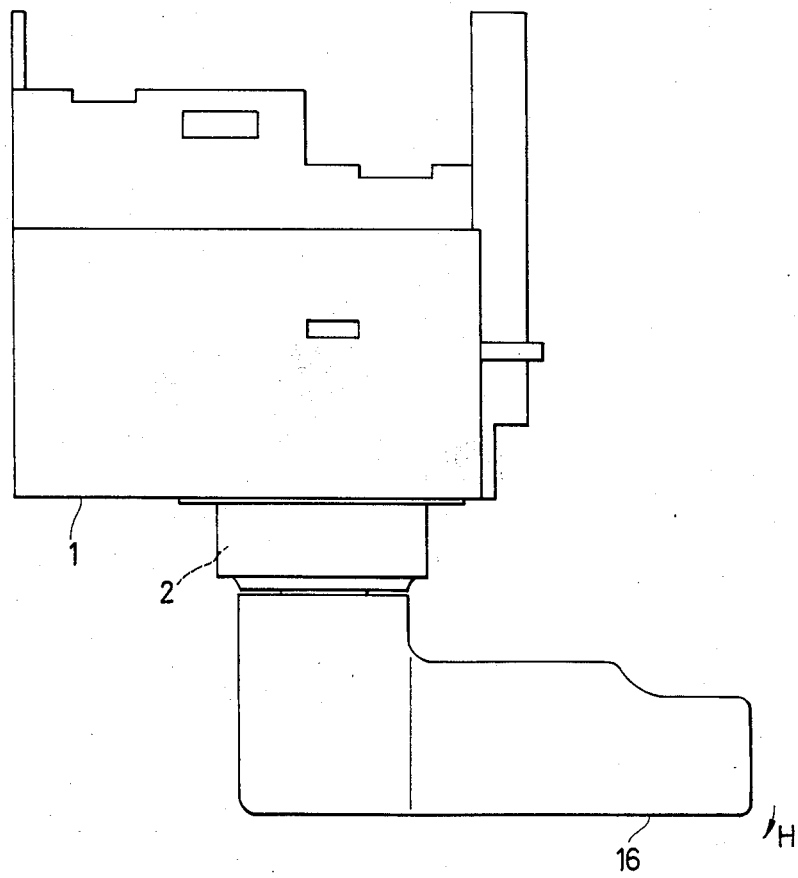
FIG. 2 is a top view of the embodiment of FIG. 1.

A preferred embodiment of the present invention will now be described with reference to the accompanying drawings. As depicted in FIGS. 1 and 2, the switch assembly includes an outer case 1 having a lever 16 projecting from the front side of the switch case. The lever 16 projects from a rectangular protrusion 2 formed on the front surface of the switch case 1. As is depicted most clearly in FIG. 3, the protrusion 2 includes a first support 3 formed by a flanged opening through the protrusion 2. As depicted in FIGS. 3 and 4, the assembly includes a switch assembly 4, the construction of which will be described in a later portion of the specification. The assembly further includes a second support 5 opposite the first support 3. A rotary member 6 depicted most clearly in FIGS. 5, 7 and 8 has an opening 7 extending from its front portion therethrough with the front portion of the member 6 engaging the front support 3 where it can be rotated therein. A bearing member 8 is inserted into the opening 7 with the rear portion of the bearing member 8 rotatably engaged within the second support 5. As is most clearly depicted in FIGS. 3, 4 and 7, a pivoting member 9 fits within the opening 7 of the rotary member 6 in such a manner that the front end portion of the pivoting member 9 protrudes from the front end of the switch case 1. The pivoting member 9 includes upper and lower stub shafts 10 which fit within the longitudinal grooves 11 on the inner surface of the opening 7. As is depicted in FIGS. 4 and 7, the bearing member 8 includes projecting arms 8a which also fit within the grooves 11 to capture the shafts 10 within the openings 11 such that the shafts 10 are rotatably supported both by the rotating member 6 and the projections 8a.

Figure 7:
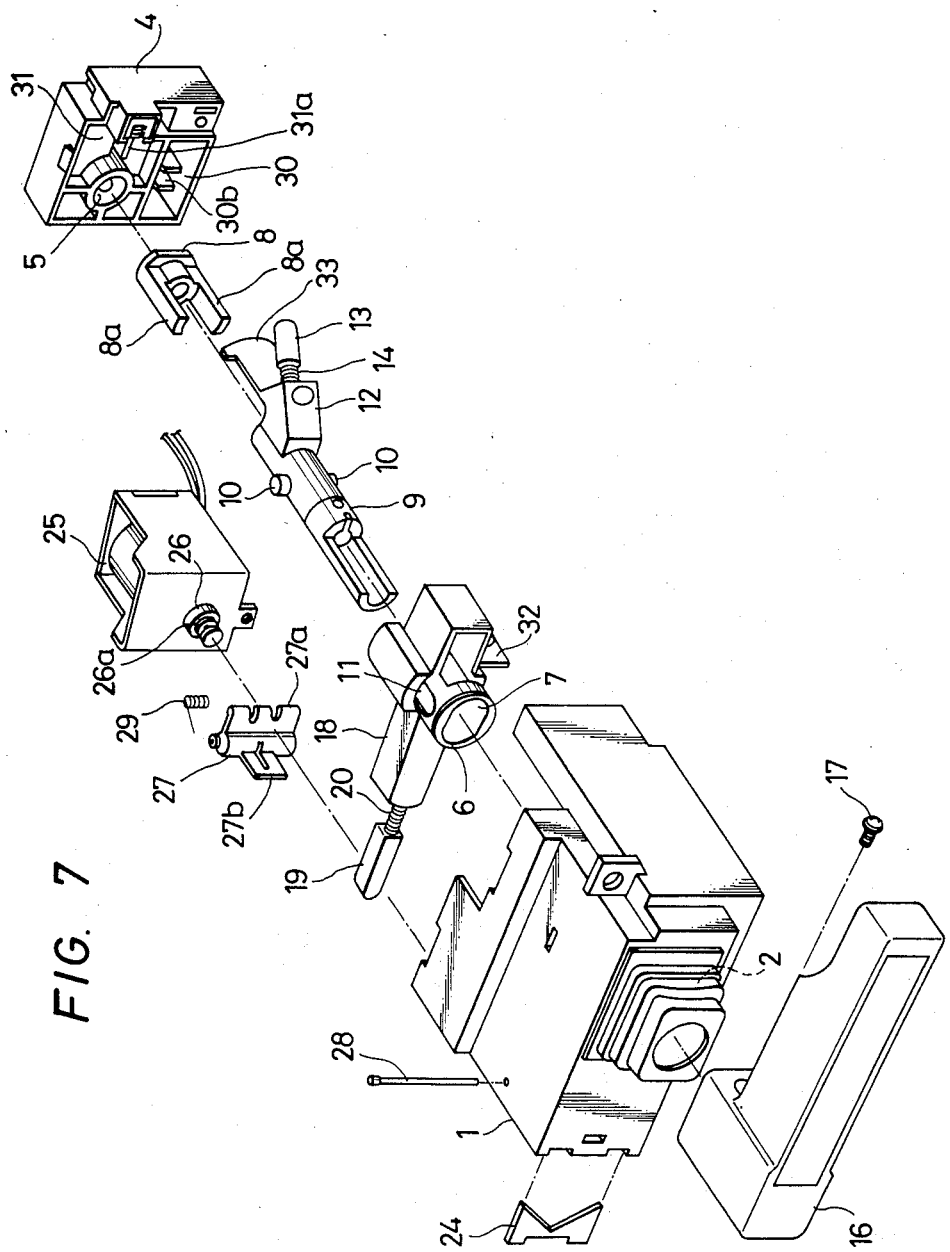
FIG. 7 is an exploded view of the embodiment of FIGS. 1-6.

As is depicted in FIGS. 3 and 7, the pivoting member 9 further includes projection 12 at the rear peripheral portion of the pivoting member 9. A plunger 13 having an internal coil spring 14 adapted to bias the plunger 13 in the direction of arrow A fits within an opening 12a formed in the protrusion 12. The plunger 13 contacts a cam surface 15 which is a portion of the rotary member 6. The pivoting member 9 is urged by the cooperation of the plunger 13 and the coil spring 14 in the direction designated as B in FIG. 3.

As is depicted in FIGS. 1-4 and 7, the assembly includes a lever 16 having a coupling opening 16a at one end thereof. The coupling opening 16a is engaged with the front portion of the pivoting member 9 and is secured thereto with a screw 17.

Figure 5:
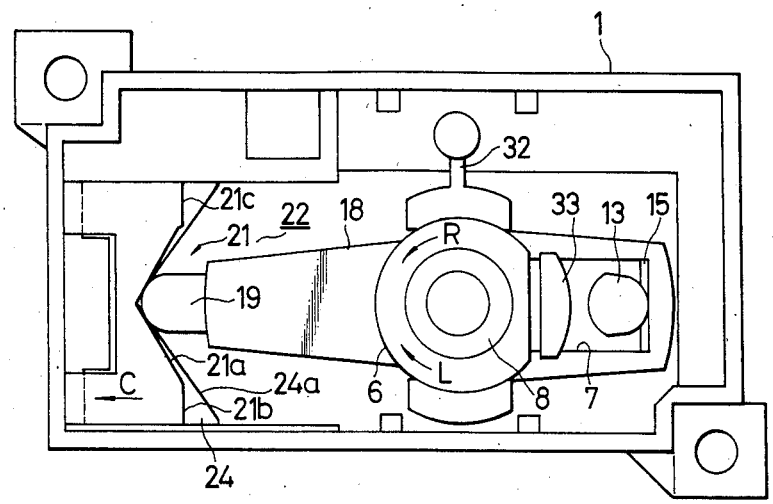
FIG. 5 is a rear view of the embodiment of FIGS. 1-4 where the electromagnetic solenoid and switch unit have been removed.
Figure 8:
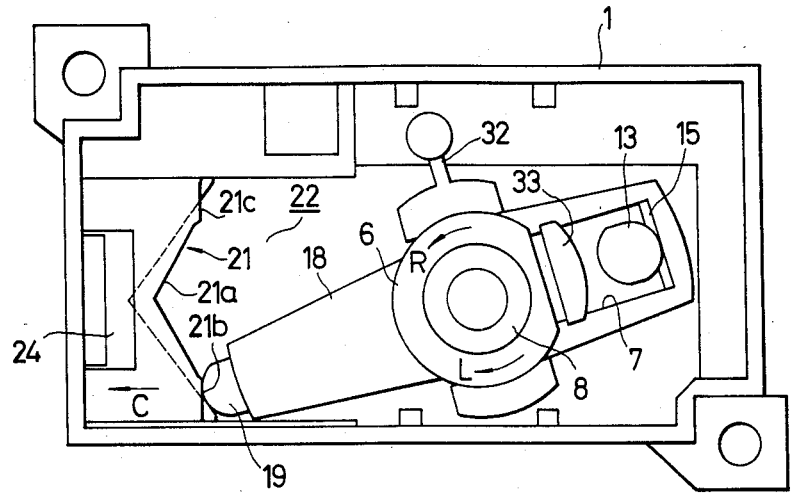
FIG. 8 is a view corresponding to FIG. 5 for depicting operation of the assembly.
Figure 9:
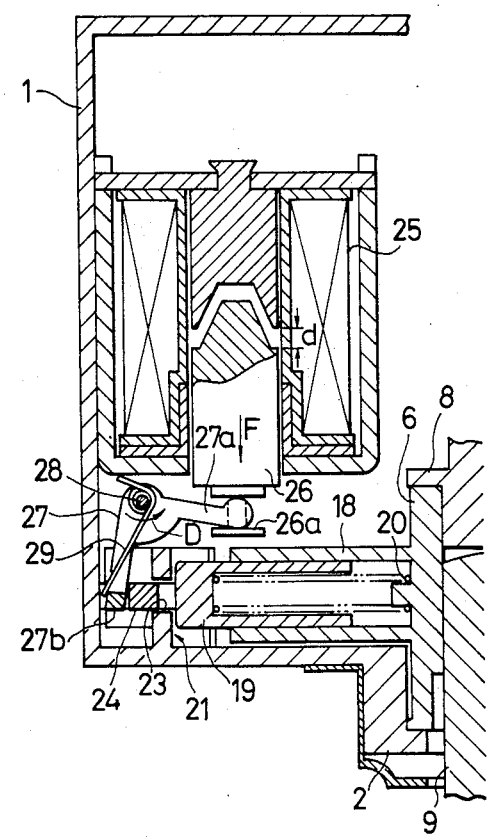
FIG. 9 is a cross-sectional view showing the operation of the solenoid in the assembly.

As shown in FIGS. 3, 5, 7, 8 and 9, the rotary member 6 includes a cylindrical projection 18 within which disposed is a cam plunger 19 which is urged in the direction C by the spring 20. As depicted in FIGS. 5 and 8, the cam plunger 19 ordinarily contacts a portion of the switch case formed into a V-shaped cam 21. The cam recess has a central V-shaped recess 21a and flat portions 21b and 21c at each extremity thereof. The cam recess, together with the cam plunger 19, form the general release mechanism 22. As depicted in FIG. 9, the cam surface 21 includes an opening 23 which receives a V-shaped flat cam member 24 which is slidably inserted within the opening 23. The cam member 24 has a V-shaped cam surface 24a which is depicted in FIG. 5.

An electromagnetic solenoid 25 is arranged within the assembly such that it is adjacent to the switch assembly 4 and confronts the release mechanism 22 within the switch case 1. The solenoid includes a central armature portion 26 which has on its exposed end an opening 26a. A substantially L-shaped transmission lever 27 is rotatably supported by a pin 28 within the case 1 with one end 27a of the transmission lever engaged with the groove 26a on the plunger 26. The other end 27b of the transmission lever 27 is abutted against the edge of the cam member 24. A torsion coil spring 29 is wound on the pin 28 and urges the transmission lever 27 in the direction of arrow D.

Figure 6:
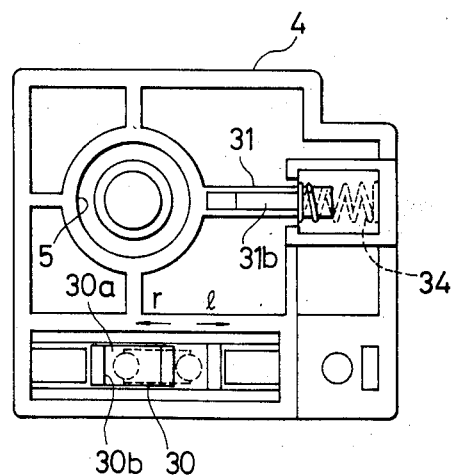
FIG. 6 is a front view of the switch unit of the embodiment of FIGS. 1-5.

As depicted in FIG. 6, the assembly includes a first switch 30 which comprises the turn signal switch and a second switch 31 which comprises the dimmer/passing switch. The switches are arranged within the switch assembly 4 in relation to the total device as depicted in FIG. 7. As is most clearly depicted in FIGS. 4, 5, 7 and 8, a transmission arm 32 extends from the rotary member 6 and is engaged with a transmission receiving groove 30b formed in the removable contact holder 30a of the first switch 30. A transmission protrusion 33 depicted most clearly in FIGS. 3 and 7 extends from one portion of the protrusion 12 on the pivoting member 9 such that it confronts one surface of the switch protrusion 31b formed on the movable contact holder 31a of the second switch 31. A coil spring 34 is disposed between the other surface of the switch protrusion 31b and the inner wall of the switch assembly 4 to urge the movable contact holder 31a in the direction of the arrow E depicted in FIG. 3.

Operation of the embodiment constructed in accordance with the invention will now be described. Normally, the lever 16 is held in the configuration depicted in FIGS. 1-3 and, therefore, the rotary member 6 is in the configuration shown in FIG. 5, while the pivoting member 9 is in the configuration shown in FIG. 3. In such a configuration, the first switch 30 is in the neutral state while the second switch 31 is in the off state. When the operating lever 16 is turned in the direction of the arrow R, as shown in FIGS. 1, 5 and 8, the end of the cam plunger 19 which has been engaged with the recess 21a of the cam 21 is now engaged with the flat portion 21b as depicted in FIG. 8. As a result, the cam member 24 is urged in the direction of arrow C, again in FIG. 8, which in turn rotates the transmission lever 27 in the direction of arrow D against the elastic force of the spring 29. The plunger 26 of the electromagnetic solenoid 25 is displaced a predetermined distance (d) in the direction of arrow F in FIG. 9. When the lever 16 is turned in the direction of the arrow R as described above, the transmission arm 32 is also turned in the direction of arrow R as shown in comparing FIGS. 5 and 8. As a result, the movable contact holder 30a of the first switch 30 is displaced in the direction of arrow r (depicted in FIG. 6) so that the right turn signal is operated causing it to blink.

Where the present embodiment is used as a turn signal device in an automobile, the steering shaft is ordinarily provided with a rotation direction detecting switch (not shown) for detecting the direction of rotation of the steering shaft. When the steering wheel is turned counterclockwise through a predetermined angle under the condition that the right turn signal blinks as described above, this detecting switch is turned on to energize the electromagnetic solenoid 25 for a short period of time. When the solenoid 25 is activated as described above, the armature 26 is moved in the direction opposite that of the arrow F shown in FIGS. 3 and 9 such that the lever 27 is rotated in the direction of the arrow D shown in FIGS. 3 and 9. Accordingly, the cam member 24 is moved in the direction opposite to the direction of arrow C so that the cam plunger 19 is displaced in the direction opposite to the direction of arrow C against the elastic force of the coil spring 20 by the cam surface 24a of the cam member 24. Therefore, the end of the cam plunger 19 is disengaged from the flat surface 21b of the cam 21. This urges the cam plunger 19 toward the center of the cam surface 24a by cooperation of the inclination of the cam surface 24a and the elastic force of the coil spring 20. In such a manner, the rotary member 6 is returned to the direction opposite to the direction of arrow R, that is, it is placed in the neutral state depicted in FIG. 5. As a result, the first switch 30 is placed in the neutral state to turn off the turn signal and the operating lever 16 is placed in a normal state as shown in FIG. 1.

On the other hand, when the operating lever 16 is turned to a predetermined angle in the direction of the arrow L from its normal position, the end of the cam plunger 19 is engaged with the flat part 21c of the cam surface 21. Therefore, the transmission arm 32 is turned in the direction of arrow L such that the movable contact holder 30a of the first switch 30 is displaced in the direction of arrow 1 as depicted in FIG. 6 to cause the first switch 30 to turn the left turn signal to cause the left turn signal lamp to blink. When under this condition the steering wheel is turned clockwise through a predetermined angle, the aforementioned detecting switch is turned on to activatee the electromagnetic solenoid 25 for a short period of time so that similarly as described above, the cam 24 is slid in the direction opposite to the direction of the arrow C. As a result, the end of the cam plunger 19 is disengaged from the flat surface 21c by the cam surface 24a of the cam 24. Therefore, similarly as the above-described case, the rotary member 6 is turned in the direction opposite to the direction of the arrow L, thus being placed in the state shown in FIG. 5. In such a condition, the first switch 30 is placed in the neutral state to turn off the turn signal lamp. The operating lever 16 is also in the normal position as shown in FIG. 1.

When the operating lever 16 is pivoted in the direction of the arrow H depicted in FIG. 1, the member 9 is pivoted in the direction opposite to the direction B shown in FIG. 3 about the stub shafts 10. The transmission protrusion 33 is turned in the same direction, thereby moving the movable contact holder 31a of the second switch 31 in a direction opposite to the direction of the arrow E by contacting the protrusion 31b. This turns off the second switch 31 so that, for instance, a passing operation is carrying out during the daytime when the light switch is ordinarily kept off and a dimmer operation is carried out at night in which the light switch is ordinarily turned on. When the member 9 pivots in the direction opposite to the direction of the arrow B, the plunger 13 being guided by the cam surface 15 is displaced in a direction opposite to the direction of arrow A to compress the coil spring 14. Therefore, when the operating lever 16 is released, the pivoting member 9 is returned in the direction of arrow B by the elastic force of the coil spring 14 being guided by the cam surface 15 so that the second switch 31 is turned off.

As is apparent from the above description, when the operating lever 16 is turned in the direction of the arrow R or L, the rotary member 6 is turned in the same direction to operate the first switch 30 which is the turn signal switch. When the lever 16 is pivoted in the direction of the arrow H, irrespective of the rotational position of the rotary member 6, the member 9 pivots in the direction opposite the direction of the arrow B with respect to the rotary member 6. This operates the second switch 31 which is the dimmer/passing switch. Thus, the first switch 30 and the second switch 31 can be operated as required by merely changing the direction of operation of the operating lever 16. This significantly improves the operation of the switch since heretofore two separate switches may have been provided with two operating levers operating the separate switches. With such devices, the operator must feel which one of two switches should be operated and operation of such switches are difficult. In the case of the switch assembly accoring to the present invention, it is unnecessary for the operator to feel the switch to determine which one of the levers is to be operated, that is the switch assembly of the present invention increases the effeciency and operation of such a device inasmuch as the two switches are built into the same switch case and the space occupied by the switch assembly is relatively small.

In addition to the present invention utility with respect to a dimmer switch and turn signal assembly, the first switch 30 and the second switch 31 may be designed so that they operate, for example, a window washer or windshield wipers.

The present invention has been described in terms of a preferred embodiment, however, the scope of the invention is not limited thereto. The scope of the invention is determined by the appended claims and the equivalents.

What is claimed is:

1. A switch assembly comprising:
   a switch case;
   a first member rotatably supported about a first axis by said switch case, said first member having an opening therethrough;
   a second member mounted to pivot between an original position and a pivoted position on a second axis extending perpendicular to said first axis, said second member being supported by said first member with a rear portion of said second member extending within said opening in said first member and a front portion of said second member protruding from the front of said switch case;
   a single operating lever attached to the front portion of said second member to selectively rotate said first member about said first axis to a first turn position, a second turn position, and a neutral position therebetween, and to pivot said second member about said second axis between said original and said pivoted positions irrespective of the rotational position of said first member;
   a first switch operably connected to said first member, said first switch operable to a first closed position in response to the rotation of said first member to said first turn position, said first switch operable to an open position in response to the rotation of said first member to said neutral position, and said first switch operable to a second closed position in response to the rotation of said first member to said second turn position;
   a second switch operably connected to said second member, said second switch operable to a closed position in response to the pivoting of said second member to said pivoted position and operable to an open position in response to the pivoting of said second member to said original position;
   means for holding said first member at said first turn position or said second turn position, respectively, when said first member is rotated;
   an electromagnetic solenoid and a cam linked to said solenoid, said solenoid and said cam operable to restore said first member to said neutral position; and
   returning means for returning and guiding said second member from said pivoted position to said original position in response to the release of said operating lever, said returning means also being operative to guide the second member from said original position to said pivoted position.

2. The switch assembly of claim 1 wherein said means for holding said first member at said first turn and said second turn positions respectively comprise:
   a cam plunger projecting from said rotary member; and
   a cam recess affixed to said switch case wherein said cam recess has a central section disposed to urge said cam plunger to said neutral position, said cam recess including at its extremities on either side of said central section two separate retaining portions.

3. The switch assembly of claim 2 wherein said central portion of said cam recess is substantially V-shaped.

4. The switch assembly of claim 2 wherein said means for restoring said first member to the neutral position comprises a cam member disposed to urge said cam plunger toward said central section.

5. The switch assembly of claim 4 wherein said cam member includes a working cam surface disposed to contact said cam plunger in response to said solenoid and urge said cam plunger from one of said retaining portions.

6. The switch assembly of claim 5 wherein said working cam surface is substantially V-shaped.

7. The switch assembly of claim 4 wherein said cam member is linked to said solenoid through a transmission lever.

8. The switch assembly of claim 7 wherein said transmission lever is substantially L-shaped.

9. The switch assembly of claim 1 wherein the returning means comprises a spring-biased plunger projecting from said second member and a cam surface comprising a portion of the first member, said plunger and said cam surface being disposed opposite each other with said plunger being biased in a direction toward the original position of the second member.

10. The switch assembly of claim 1 wherein said assembly includes first switch engaging means projecting from said first member for engaging said first switch.

11. The switch assembly of claim 1 wherein said assembly includes second switch engaging means projecting from said second member for engaging said second switch.

12. The switch assembly of claim 9, wherein the cam surface includes a first and second end and an angled surface intermediate said first and second ends, and wherein the plunger maintains contact with and is guided by the cam surface as the second member pivots between its original and pivoted positions.

13. The switch assembly of claim 9, wherein the plunger projects from said second member at an acute angle measured from the first axis about which the first member is rotatably supported.

14. The switch assembly of claim 11, wherein a gap is formed between the second switch engaging means and the second switch at times when the operating lever is rotated to the first and second turn positions.

* * * * *

UNITED STATES PATENT AND TRADEMARK OFFICE
CERTIFICATE OF CORRECTION

PATENT NO. : 4,801,770

DATED : January 31, 1989

INVENTOR(S) : KAZUO YUKITOMO et al.

It is certified that error appears in the above-identified patent and that said Letters Patent is hereby corrected as shown below:

Claim 2, column 6, line 40; after "said" delete "rotory" and insert --first--.

Signed and Sealed this

Twenty-fourth Day of October, 1989

Attest:

DONALD J. QUIGG

Attesting Officer

Commissioner of Patents and Trademarks